United States Patent
Kang et al.

(10) Patent No.: US 11,691,589 B2
(45) Date of Patent: Jul. 4, 2023

(54) DRIVER-SIDE AIRBAG DEVICE

(71) Applicant: HYUNDAI MOBIS CO., LTD., Seoul (KR)

(72) Inventors: Byung Gu Kang, Yongin-si (KR); Do Hyoung Kim, Yongin-si (KR); Seok Hoon Ko, Yongin-si (KR)

(73) Assignee: Hyundai Mobis Co., Ltd., Seoul (KR)

(*) Notice: Subject to any disclaimer, the term of this patent is extended or adjusted under 35 U.S.C. 154(b) by 0 days.

(21) Appl. No.: 16/913,359

(22) Filed: Jun. 26, 2020

(65) Prior Publication Data
US 2020/0406848 A1 Dec. 31, 2020

(30) Foreign Application Priority Data
Jun. 26, 2019 (KR) .................. 10-2019-0076172

(51) Int. Cl.
  *B60R 21/215* (2011.01)
  *B60Q 3/283* (2017.01)
  *B60R 21/203* (2006.01)

(52) U.S. Cl.
  CPC ............ *B60R 21/215* (2013.01); *B60Q 3/283* (2017.02); *B60R 21/203* (2013.01); *B60R 2021/21543* (2013.01)

(58) Field of Classification Search
  CPC .... B60R 21/21656; B60R 2021/21543; B60R 21/215; B60R 21/203; B60R 13/005; B60R 21/235; B60R 2021/23509; B60Q 3/283
  See application file for complete search history.

(56) References Cited

U.S. PATENT DOCUMENTS

| | | | | |
|---|---|---|---|---|
| 5,531,469 A * | 7/1996 | Iino | ..... | B29C 45/0013 280/728.3 |
| 6,082,762 A * | 7/2000 | Preisler | ..... | B29C 43/203 280/728.3 |
| 6,099,027 A * | 8/2000 | Shirk | ..... | B60R 13/005 280/728.3 |
| 6,168,187 B1 * | 1/2001 | Yamada | ..... | B60R 13/005 280/728.3 |
| 6,508,143 B2 * | 1/2003 | Ibe | ..... | B60R 13/005 403/348 |
| 6,760,989 B2 * | 7/2004 | Peterson | ..... | G09F 7/00 40/593 |
| 6,818,305 B2 * | 11/2004 | Murar | ..... | B29C 43/203 428/412 |
| 7,520,528 B2 * | 4/2009 | Nakamura | ..... | B60Q 1/1484 280/728.3 |
| 7,622,169 B2 * | 11/2009 | Oh | ..... | B60R 13/005 428/31 |

(Continued)

*Primary Examiner* — Drew J Brown
*Assistant Examiner* — Timothy Wilhelm
(74) *Attorney, Agent, or Firm* — H.C. Park & Associates, PLC

(57) ABSTRACT

A driver-side airbag device includes: a mounting plate; a cushion disposed inside the mounting plate and configured to be inflated by gas supplied thereto; a cover surrounding the cushion and having a movable lid to be cut and tilted by an inflation of the cushion; a decoration part disposed on a front surface of the movable lid and to be rotated together with the movable lid; and a connector having one side disposed between the cover and the decoration part and another side coupled to the mounting plate, the connector configured to restrain forward deployment of the cover when the cushion is inflated.

14 Claims, 9 Drawing Sheets

(56) References Cited

U.S. PATENT DOCUMENTS

| | | | | |
|---|---|---|---|---|
| 7,703,799 B2* | 4/2010 | Takagi | B60R 21/21656 | 280/728.3 |
| 7,766,371 B2* | 8/2010 | Fujimori | B60R 21/21656 | 280/728.3 |
| 7,866,858 B2* | 1/2011 | Hirzmann | G09F 13/22 | 362/488 |
| 7,887,088 B2* | 2/2011 | Worrell | B60R 21/21658 | 280/731 |
| 7,891,699 B2* | 2/2011 | Worrell | B60R 21/21656 | 280/728.3 |
| 8,061,861 B2* | 11/2011 | Paxton | B60Q 3/283 | 362/84 |
| 8,104,792 B2* | 1/2012 | Taniyama | B60R 21/2338 | 280/743.1 |
| 8,215,663 B2* | 7/2012 | Shimazaki | B60R 21/2346 | 280/728.2 |
| 8,267,422 B2* | 9/2012 | Sauer | B60R 21/2035 | 280/728.3 |
| 8,424,904 B2* | 4/2013 | Cech | B60R 11/0247 | 280/728.3 |
| 8,459,713 B2* | 6/2013 | Sella | B60R 21/215 | 296/1.08 |
| 8,585,082 B2* | 11/2013 | Yamaji | B60Q 5/003 | 280/731 |
| 8,651,680 B2* | 2/2014 | Rick | B60Q 3/68 | 362/84 |
| 8,894,093 B2* | 11/2014 | Jung | B60R 21/2165 | 280/728.3 |
| 8,905,430 B2* | 12/2014 | Ishikawa | B60R 21/215 | 280/728.3 |
| 8,925,959 B2* | 1/2015 | Bosch | B60Q 3/283 | 280/728.3 |
| 9,061,650 B2* | 6/2015 | Ko | B60R 21/203 | |
| 9,067,556 B2* | 6/2015 | Bosch | B60R 13/005 | |
| 9,248,801 B2* | 2/2016 | Bichler | B60R 21/21656 | |
| 9,321,420 B2* | 4/2016 | Kwon | B60R 21/21656 | |
| 9,457,757 B2* | 10/2016 | Kawabe | B60R 21/203 | |
| 9,550,468 B2* | 1/2017 | Hellot | B60R 21/216 | |
| 9,650,009 B2* | 5/2017 | Bana Castro | B60R 21/2155 | |
| 9,694,780 B1* | 7/2017 | Lowe | B60R 21/21656 | |
| 9,988,000 B2* | 6/2018 | Barros Alonso | B60R 21/203 | |
| 2005/0225006 A1* | 10/2005 | Murar | B29C 43/3697 | 264/275 |
| 2006/0125217 A1* | 6/2006 | Nakamura | B60R 13/005 | 280/731 |
| 2007/0126216 A1* | 6/2007 | Nakamura | B60R 21/215 | 280/731 |
| 2015/0283961 A1* | 10/2015 | Barreiro Garcia | B60R 21/215 | 40/1.5 |
| 2020/0148156 A1* | 5/2020 | Kwon | B60R 21/215 | |
| 2021/0061189 A1* | 3/2021 | Fujimori | B60Q 3/283 | |

* cited by examiner

DRIVER-SIDE AIRBAG DEVICE

CROSS-REFERENCE TO RELATED APPLICATION

This application claims priority from and the benefit of Korean Patent Application No. 10-2019-0076172, filed on Jun. 26, 2019, which is hereby incorporated by reference for all purposes as if set forth herein.

BACKGROUND

Field

Exemplary embodiments of the present disclosure relate to a driver-side airbag device, and more particularly, to a driver-side airbag device that guides a cover equipped with an attachment including a lighting emblem in order to prevent the cover from flying toward passengers or interfering with cushion deployment when an airbag is deployed.

Discussion of the Background

In general, airbag systems for vehicles are to instantaneously inflate an air bag in the event of a collision to reduce injuries due to impact, independently of seat belts.

Among these airbag systems, a driver airbag system is to instantly inflate an airbag between a driver and a steering wheel in the event of a vehicle collision to reduce injuries due to impact.

A vehicular driver airbag is disposed on a steering wheel. In the event of a vehicle forward collision, the airbag is deployed with gas produced by the inflator within the airbag to protect a driver. The airbag is inflated by the gas pressure therein to early restrain the head and chest of the driver, thereby preventing the driver from being injured due to contact with the steering wheel.

With the recent emergence of autonomous vehicles, it is expected that a driver-side airbag, equipped with at least one of a lighting emblem, a display, a lighting device, and the like, appears. In this case, an overweight structure may be added on the cover of the driver-side airbag, compared to the past, and due to the weight of the lighting emblem, display, and lighting device, the cover may break and fly when opened during deployment of the airbag. In addition, the display or the lighting structure may be tilted due to its large size and may thus strike passengers or interfere with cushion deployment. Therefore, it is necessary to improve these issues.

SUMMARY

Various embodiments are directed to a driver-side airbag device that guides a cover equipped with an attachment including a lighting emblem in order to prevent the cover from flying toward passengers or interfering with cushion deployment when an airbag is deployed.

In an embodiment, there is provided a driver-side airbag device that includes a mounting plate installed on a steering wheel, a cushion positioned inside the mounting plate and inflated by working gas supplied thereto, a cover installed to surround the cushion and having a movable lid that is cut and tilted by the inflation of the cushion, a decoration part positioned on a front surface of the movable lid and rotated together with the movable lid, and a connector whose one side is positioned between the cover and the decoration part while the other side of the connector is fixed to the mounting plate, so that the connector restrains forward deployment of the cover when the cushion is inflated.

The cover may include a cover housing being installed to surround the mounting plate.

The decoration part may include a glass made of a material to transmit light, an emblem positioned between the glass and the movable lid to display a coat of arms, an inner panel positioned between the emblem and the movable lid, the inner panel facing the glass, and a light source positioned between the inner panel and the movable lid to radiate light toward the emblem through the inner panel.

The decoration part may further include a diffuser positioned between the inner panel and the light source to diffuse light from the light source to the inner panel.

The decoration part may further include a ring-shaped fixed body installed along an outer edge of the glass, and a protruding member extending through the glass, the inner panel, the connector, and the movable lid from the fixed body.

The protruding member may consist of a plurality of protruding members installed circumferentially along the fixed body.

The connector may include a first member positioned between the light source and the movable lid and fixed to the movable lid by the protruding member, a second member fixed to the mounting plate, and a connection member configured to interconnect the first member and the second member.

The cover may be fixed to the mounting plate in a state in which the second member is temporarily assembled to the cover, and the second member may be fixed to the mounting plate after the cover has been fixed.

The connection member may be installed between the cover and the mounting plate.

The connector may be made of a woven material or a material having bending properties.

As apparent from the above description, the driver-side airbag device according to the present disclosure can improve the operational reliability of the airbag by preventing the movable lid from being deployed toward passengers when the cushion is deployed, since the movable lid, equipped with the decoration part, is connected to the connector fixed to the mounting plate.

DETAILED DESCRIPTION OF THE ILLUSTRATED EMBODIMENTS

Hereinafter, a driver-side airbag device will be described below with reference to the accompanying drawings through various exemplary embodiments. It should be noted that the drawings are not necessarily to scale and may be exaggerated in thickness of lines or sizes of components for clarity and convenience of description.

Furthermore, the terms as used herein are terms defined in consideration of functions of the disclosure and may change depending on the intention or practice of a user or an operator. Therefore, these terms should be defined based on the overall disclosure set forth herein.

Figure 1:
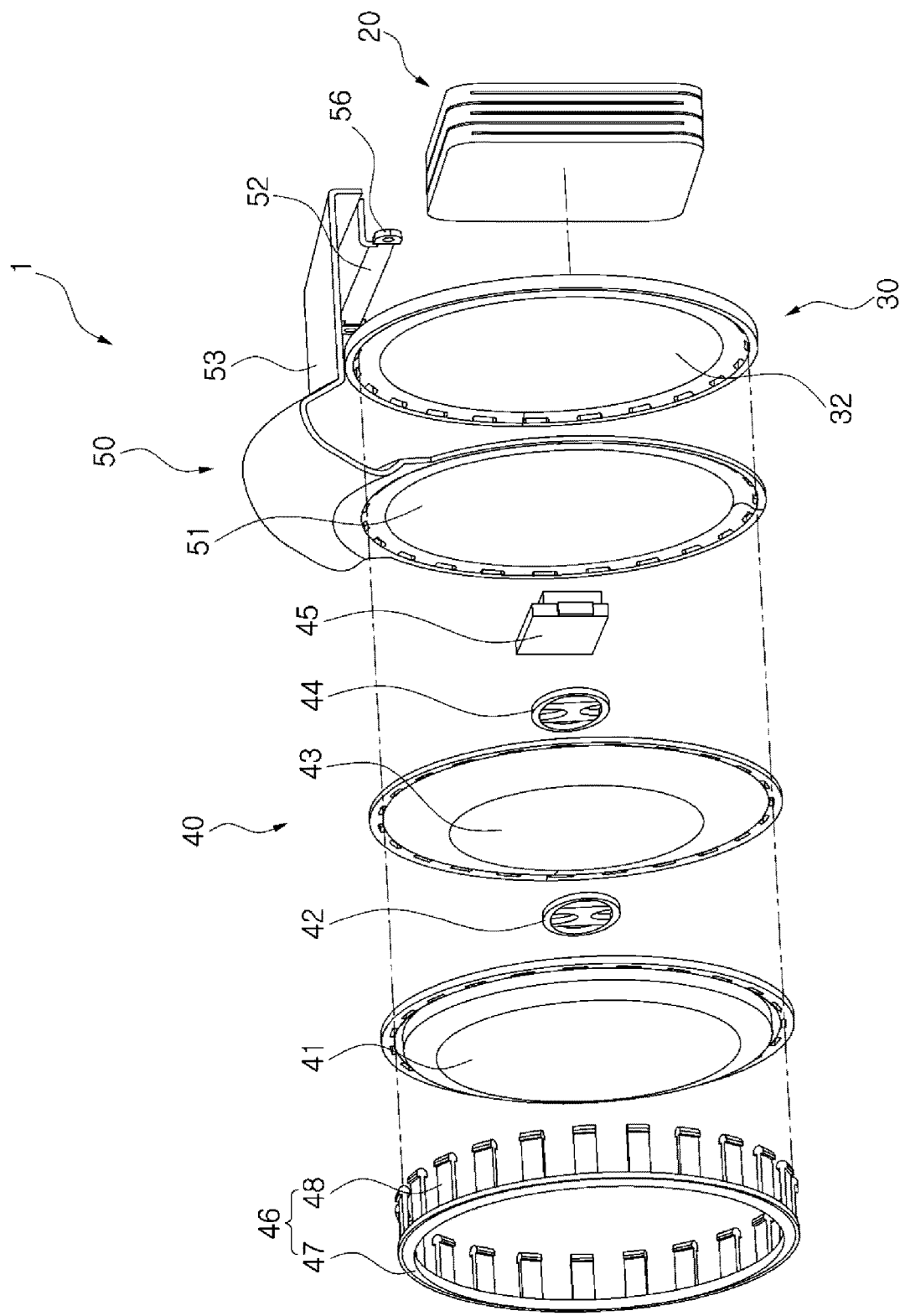
FIG. 1 is an exploded perspective view illustrating a driver-side airbag device according to an embodiment of the present disclosure.
Figure 2:
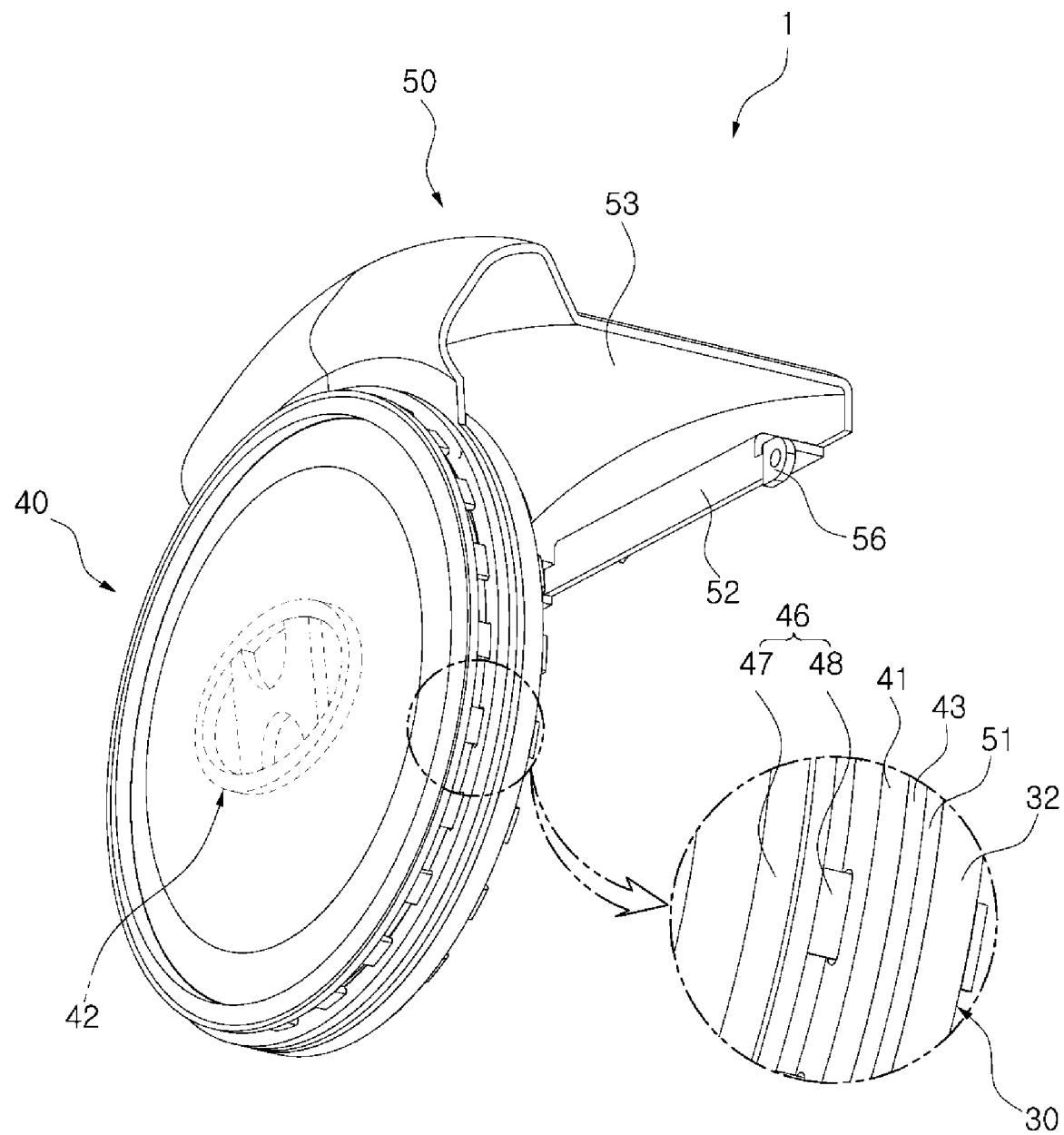
FIG. 2 is a perspective view illustrating a main configuration of the driver-side airbag device according to the embodiment of the present disclosure.
Figure 3:
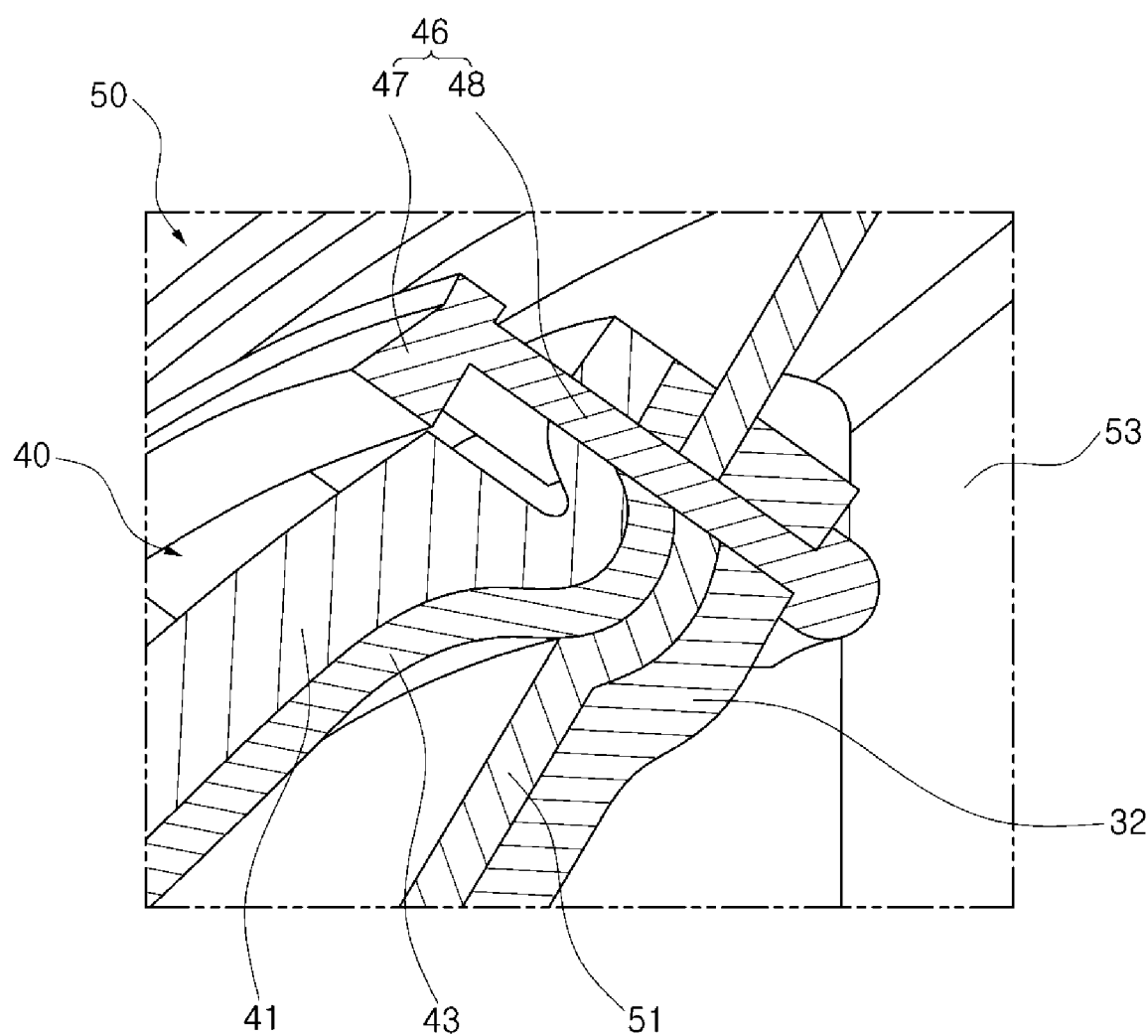
FIG. 3 is a perspective view illustrating an installed state of a fixture according to the embodiment of the present disclosure.
Figure 4:
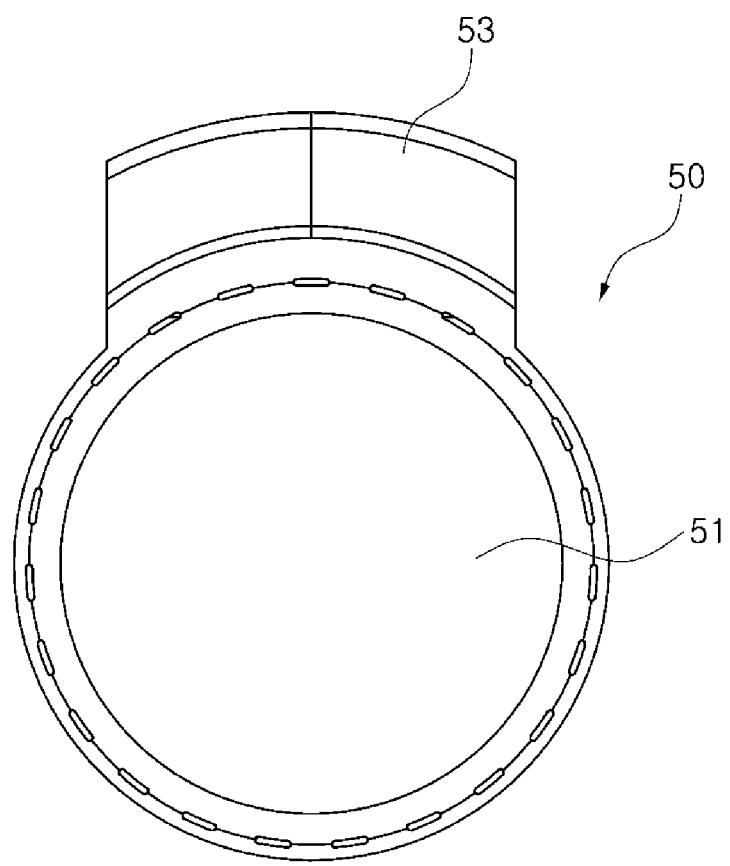
FIG. 4 is a front view illustrating a connector according to the embodiment of the present disclosure.
Figure 5:
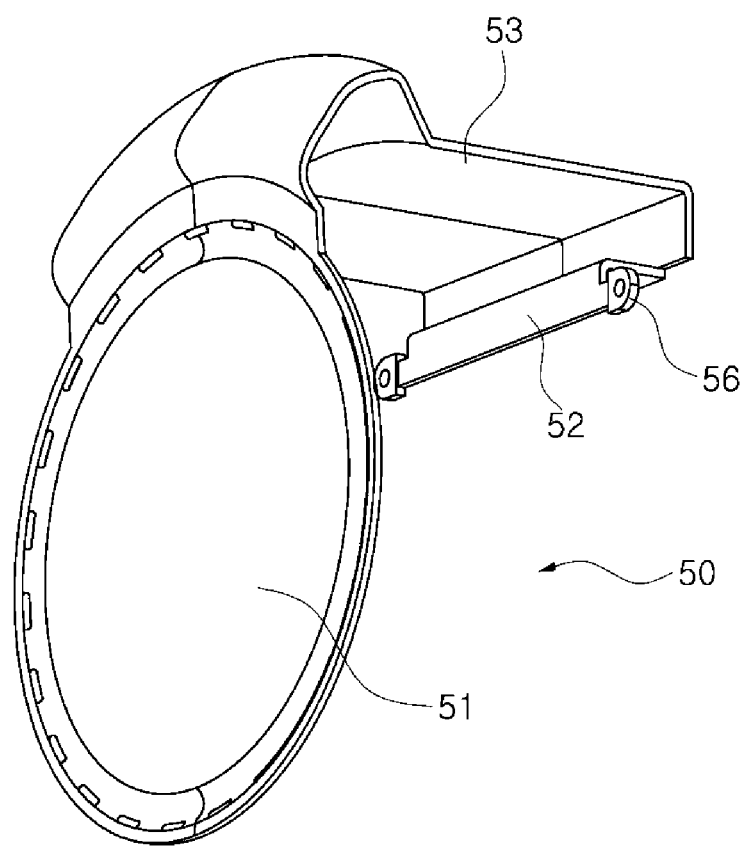
FIG. 5 is a perspective view illustrating a state in which the connector is provided with a connection hole according to the embodiment of the present disclosure.
Figure 6:
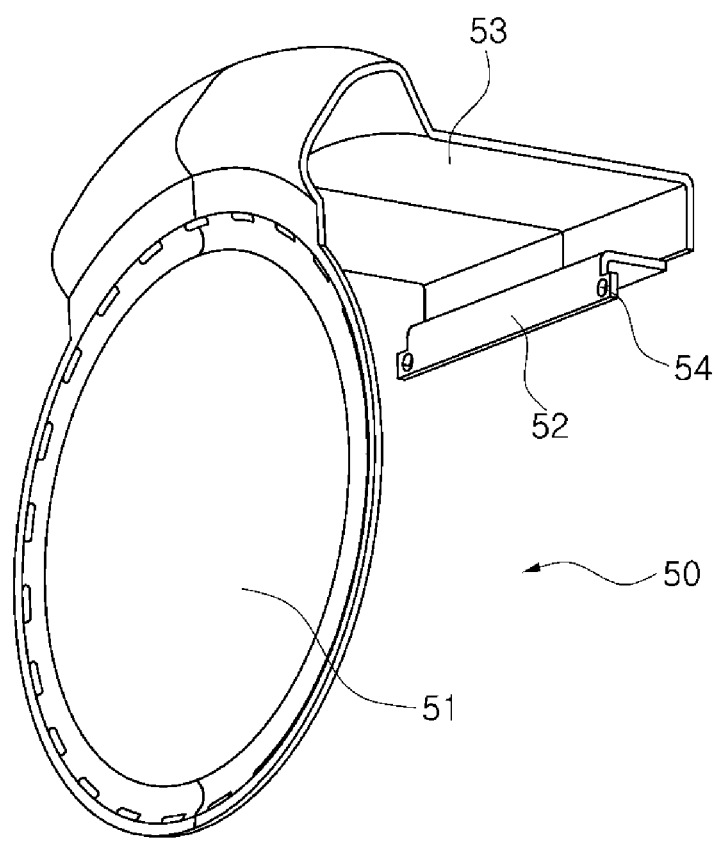
FIG. 6 is a perspective view illustrating a state in which the connector is provided with a bracket according to the embodiment of the present disclosure.
Figure 7:
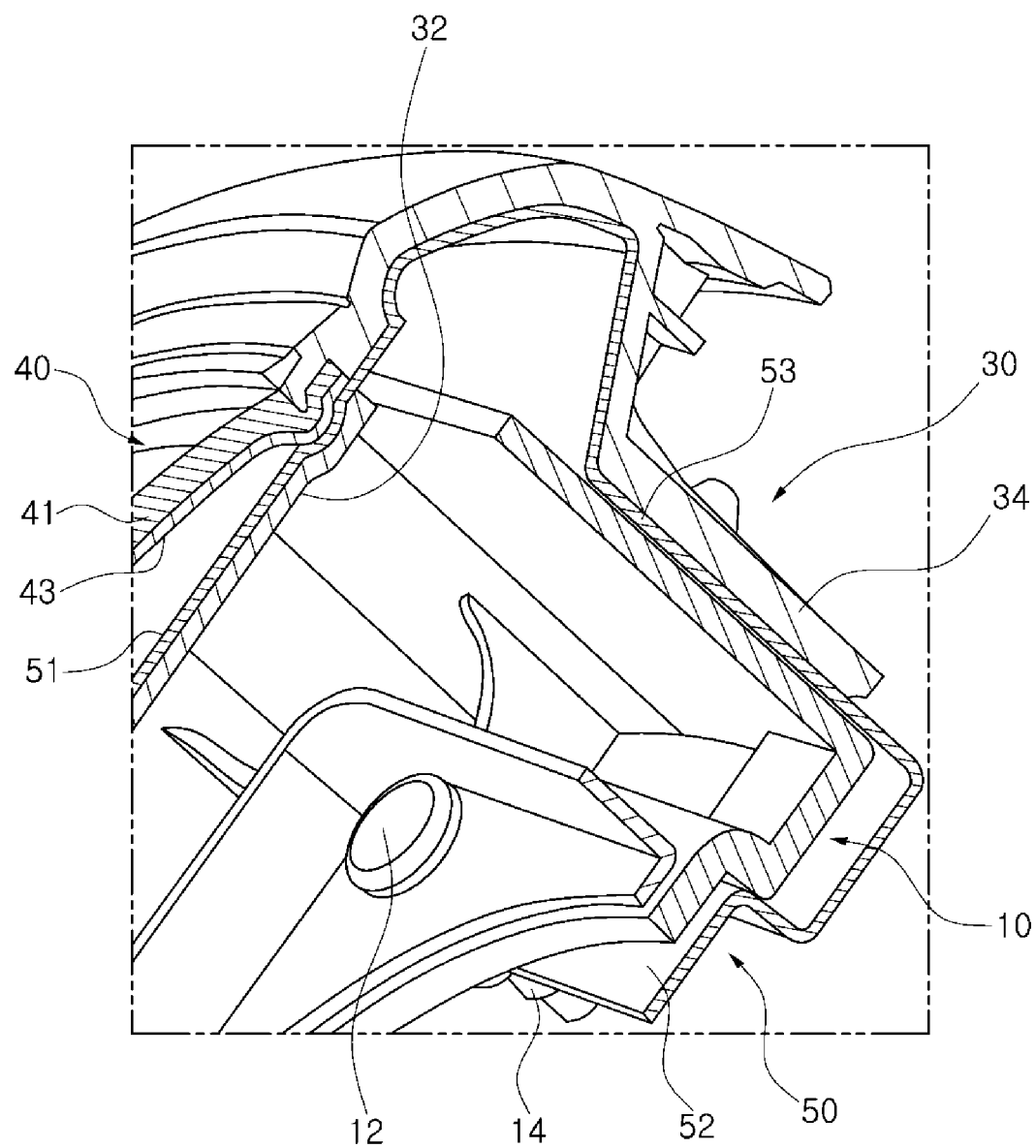
FIG. 7 is a perspective view illustrating a state in which the connector is positioned between a mounting plate and a cover housing according to the embodiment of the present disclosure.
Figure 8:
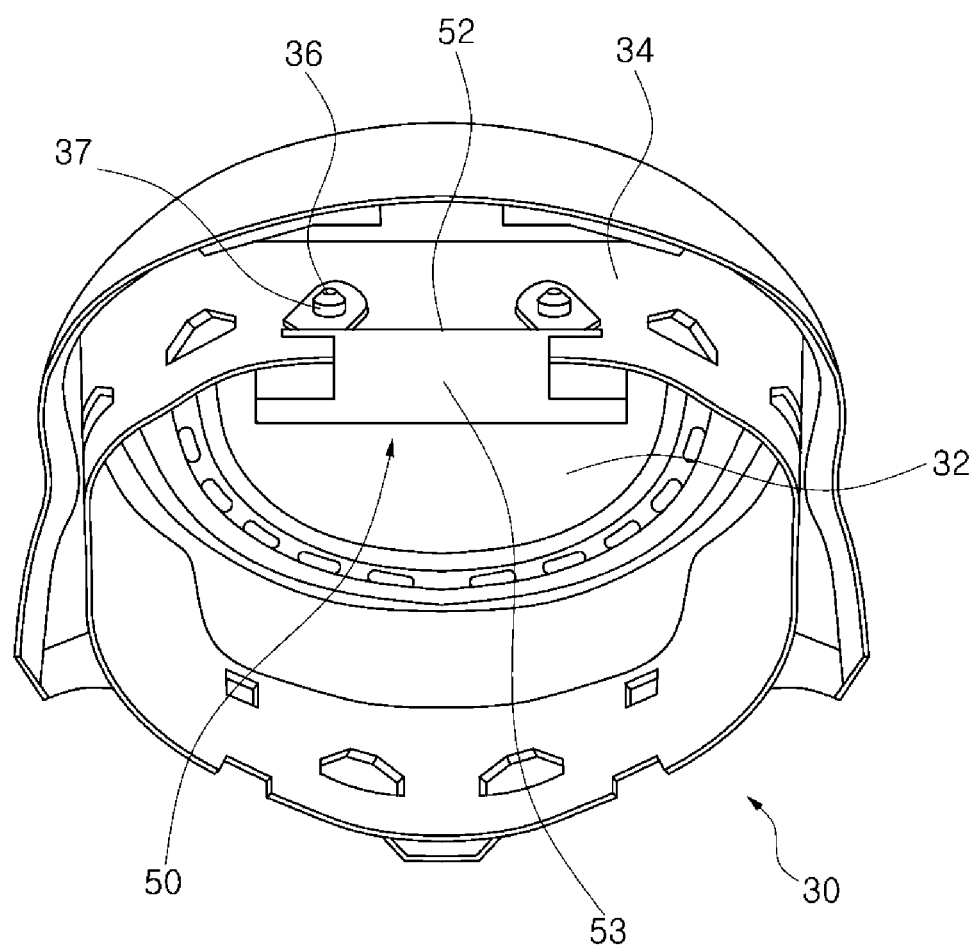
FIG. 8 is a perspective view illustrating a state in which the connector is temporarily assembled to a cover according to the embodiment of the present disclosure.
Figure 9:
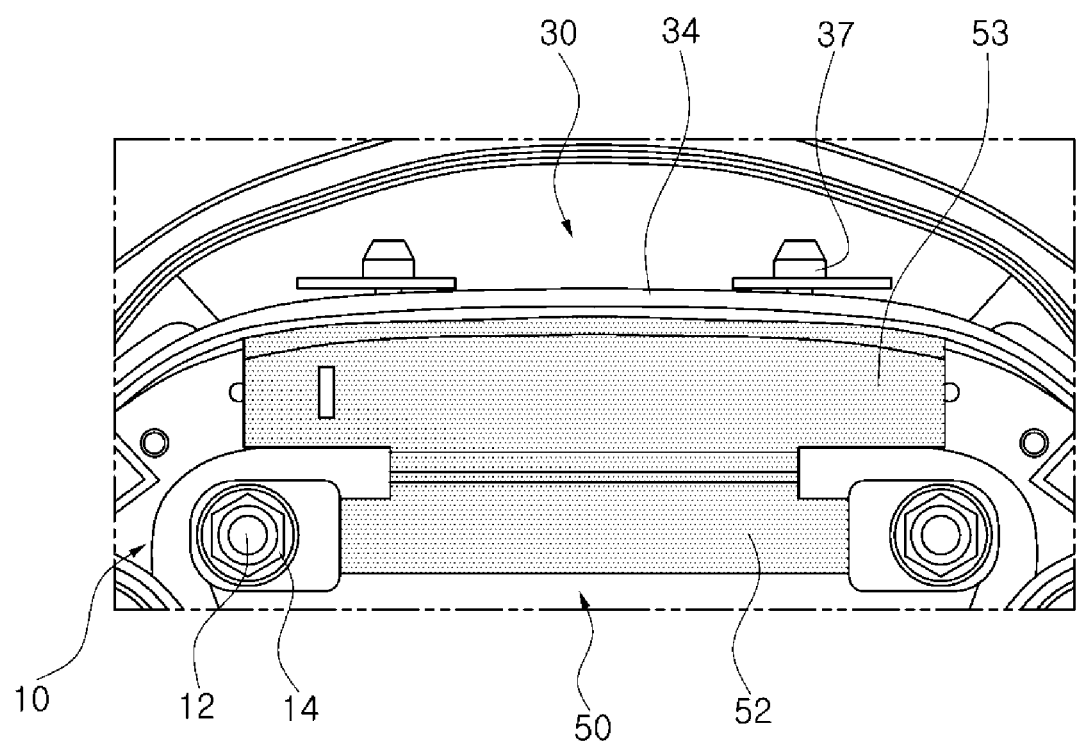
FIG. 9 is a perspective view illustrating a state in which the connector is finally assembled to the mounting plate according to the embodiment of the present disclosure.

FIG. 1 is an exploded perspective view illustrating a driver-side airbag device according to an embodiment of the present disclosure. FIG. 2 is a perspective view illustrating a main configuration of the driver-side airbag device according to the embodiment of the present disclosure. FIG. 3 is a perspective view illustrating an installed state of a fixture according to the embodiment of the present disclosure. FIG. 4 is a front view illustrating a connector according to the embodiment of the present disclosure. FIG. 5 is a perspective view illustrating a state in which the connector is provided with a connection hole according to the embodiment of the present disclosure. FIG. 6 is a perspective view illustrating a state in which the connector is provided with a bracket according to the embodiment of the present disclosure. FIG. 7 is a perspective view illustrating a state in which the connector is positioned between a mounting plate and a cover housing according to the embodiment of the present disclosure. FIG. 8 is a perspective view illustrating a state in which the connector is temporarily assembled to a cover according to the embodiment of the present disclosure. FIG. 9 is a perspective view illustrating a state in which the connector is finally assembled to the mounting plate according to the embodiment of the present disclosure.

As illustrated in FIGS. 1 to 9, the driver-side airbag device, which is designated by reference numeral 1, according to the embodiment of the present disclosure includes a mounting plate 10 installed on a steering wheel, a cushion 20 positioned inside the mounting plate 10 and inflated by working gas supplied thereto, a cover 30 installed to surround the cushion 20 and having a movable lid 32 that is cut and tilted by the inflation of the cushion 20, a decoration part 40 positioned on the front surface of the movable lid 32 and rotated together with the movable lid 32, and a connector 50 whose one side is positioned between the cover 30 and the decoration part 40 while the other side of the connector 50 is fixed to the mounting plate 10, so that the connector 50 restrains forward deployment of the cover 30 when the cushion 20 is inflated.

The mounting plate 10 is fixed to the steering wheel. Inside the mounting plate 10, an inflator configured to produce working gas and the cushion 20 inflated by working gas are installed in a folded state. The mounting plate 10 is connected to the cover 30 by at least one connection structure.

The cushion 20 is positioned inside the mounting plate 10, and may have various shapes as long as it is inflated by the working gas supplied thereto. In the embodiment, the cushion 20 is installed in a folded state inside the cover 30.

The cover 30 is installed to surround the front of the cushion 20, and may have various shapes as long as it has the movable lid 32 that is cut and tilted rearward by the inflation of the cushion 20. In the embodiment, the cover 30 includes the movable lid 32, a cover housing 34, a side bolt 36, and a side nut 37.

In the embodiment, the movable lid 32 has a disk shape and has a plurality of apertures formed at the edge thereof along the circumference thereof. The decoration part 40 is assembled to the front of the movable lid 32, and a first member 51 of the connector 50 is positioned between the decoration part 40 and the movable lid 32. Thus, the decoration part 40, the first member 51 of the connector 50, and the movable lid 32 are moved together.

The cover housing 34 is provided therein with a deployment hole corresponding to the movable lid 32, and is fixed to the mounting plate 10. The cushion 20 and the mounting plate 10 are positioned inside the cover housing 34. The cover housing 34 is fixed to the mounting plate 10 so as not to move, and is provided therein with the deployment hole serving as a passage through which the cushion 20 is deployed. That is, the cover housing 34 having the deployment hole in front of the movable lid 32 is installed to surround the mounting plate 10.

The movable lid 32 connected with the decoration part 40 may be connected to the cover housing 34, and a tear line, which is cut when the cushion 20 is deployed, may be formed at the boundary between the movable lid 32 and the cover housing 34. Thus, the tear line between the movable lid 32 and the cover housing 34 is cut when the cushion 20 is deployed, so that the decoration part 40 including lighting is rotated together with the movable lid 32.

The decoration part 40 is positioned on the front surface of the movable lid 32, and may be modified in various shapes as long as it is rotated together with the movable lid 32. In the embodiment, the decoration part 40 includes a glass 41, an emblem 42, an inner panel 43, a diffuser 44, a light source 45, and a fixture 46.

The glass 41 may be modified in various shapes as long as it is made of a material to transmit light. In the embodiment, the glass 41 has a disk shape, and is convex forward at the center thereof.

The emblem 42 is positioned between the glass 41 and the movable lid 32, and may be modified in various shapes as long as it displays a coat of arms.

The inner panel 43 is positioned between the emblem 42 and the movable lid 32, and faces the glass 41. Similar to the glass 41, the inner panel 43 also has a disk shape and is convex forward at the center thereof. The inner panel 43 is also made of a material to transmit light.

The diffuser 44 is positioned between the inner panel 43 and the light source 45, and may be modified in various shapes as long as it diffuses light from the light source 45 to the inner panel 43. In the embodiment, the diffuser 44 has the same shape as the emblem 42, and is installed at a position facing the center of the inner panel 43.

The light source 45 is positioned between the inner panel 43 and the movable lid 32, and may be modified in various shapes as long as it radiates light toward the emblem 42 through the inner panel 43. In the embodiment, the light source 45 is positioned between the diffuser 44 and the first member 51 of the connector 50 and radiates light toward the diffuser 44.

The fixture 46 may be modified in various shapes as long as it fixes the glass 41, the inner panel 43, the first member 51, and the movable lid 32 by passing through them in a state in which the glass 41, the inner panel 43, the first member 51, and the movable lid 32 are sequentially stacked. In the embodiment, the fixture 46 includes a ring-shaped fixed body 47 installed along the outer edge of the glass 41, and a protruding member 48 extending through the glass 41, the inner panel 43, the connector 50, and the movable lid 32 from the fixed body 47. The protruding member 48 may consist of a plurality of protruding members installed circumferentially along the fixed body 47.

The ring-shaped fixed body 47 is installed along the outer edge of the glass 41. The protruding member 48 protruding from the fixed body 47 has a head member that is caught inside the movable lid 32 through an aperture formed at the edge of the glass 41, an aperture formed at the edge of the inner panel 43, and an aperture formed at the edge of the first member 51, and an aperture formed at the edge of the movable lid 32. Thus, the decoration part 40, the first member 51 of the connector 50, and the movable lid 32 are moved as one module.

One side of the connector 50 is positioned between the cover 30 and the decoration part 40 and the other side of the connector 50 is fixed to the mounting plate 10, so that the connector 50 restrains forward deployment of the cover 30 when the cushion 20 is inflated. Since the connector 50 is made of a woven material or a material having bending properties, it guides the movable lid 32 rotated together with the decoration part 40 when the cushion 20 is deployed.

The connector 50 is connected along the inner surface of the cover housing 34. The connector 50 is provided with a connection hole 54, which is a hole for temporary assembly or final fastening as illustrated in FIG. 6, or is coupled to a bracket 56 which is a structure having a hole as illustrated in FIG. 5. The bracket 56 may be made of various materials as well as plastic or steel.

As illustrated in FIGS. 4 to 7, the connector 50 is positioned between the constituent components of the decoration part 40 or between the decoration part 40 and the movable lid 32, and is coupled to the movable lid 32 by the fixture 46. An opposite side of the connector 50 made of a woven strap is pulled out of the cover housing 34 through the space between the cover housing 34 and the mounting plate 10. At least one protrusion is provided on the outer wall of the cover housing 34 to fix a second member 52 of the connector 50.

As illustrated in FIGS. 1 to 9, in the embodiment, the connector 50 includes the first member 51 positioned between the light source 45 and the movable lid 32 and fixed to the movable lid 32 by the protruding member 48, the second member 52 fixed to the mounting plate 10, and a connection member 53 configured to interconnect the first member 51 and the second member 52.

The cover 30 is fixed to the mounting plate 10 in a state in which the second member 52 is temporarily assembled to the cover 30. The second member 52 is fixed to the mounting plate 10 after the cover 30 has been fixed. Since the connection member 53 is installed between the cover 30 and the mounting plate 10, it is possible to improve the operational reliability of the airbag by minimizing interference with other components when the cushion 20 is deployed.

Hereinafter, the assembly and operating state of the driver-side airbag device 1 according to the embodiment of the present disclosure will be described in detail with reference to the accompanying drawings.

The first member 51 of the connector 50, which is made of the woven material, is installed at a position facing the movable lid 32. The light source 45, the diffuser 44, the inner panel 43, the emblem 42, and the glass 41 are sequentially positioned in front of the first member 51, and are fixed to each other by the fixture 46.

In the state in which the fixed body 47 of the fixture 46 faces the outer edge of the glass 41, the protruding member 48 protruding from the fixed body 47 is installed through the apertures formed at the edges of the respective glass 41, inner panel 43, first member 51, and movable lid 32 in turn.

The connection member 53 is installed through the space between the cover housing 34 and the mounting plate 10. The second member 52 is temporarily fixed by the side bolt 36 and the side nut 37 located on the side of the cover housing 34.

After the final assembly of the cover 30 to the mounting plate 10, the second member 52, fixed by the side bolt 36 and the side nut 37, is unlocked and then fixed to a fixing bolt 12 and a fixing nut 14 provided on the mounting plate 10. Accordingly, the assembly of the driver-side airbag device 1 is completed.

In this state, when the cushion 20 is deployed due to a vehicle collision or the like, the movable lid 32 is pushed against the cushion 20 to move out of the cover housing 34. In this case, since the movable lid 32 is connected by the connector 50, the movable lid 32 is rotated upward of the cover housing 34 and then rotated rearward. Therefore, the movable lid 32 does not interfere with the development of the cushion 20.

Since the decoration part 40, which is connected to the movable lid 32 and has a lighting function, is also rotated rearward of the cover housing 34 together with the movable lid 32, it is possible to protect passengers from injuries.

As described above, according to the present disclosure, since the movable lid 32, equipped with the decoration part 40, is connected to the connector 50 fixed to the mounting plate 10. Therefore, it is possible to prevent the movable lid 32 from being deployed toward passengers when the cushion 20 is deployed, thereby improving the operational reliability of the airbag.

Although the exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A driver-side airbag device comprising:
a mounting plate installed on a steering wheel;
a cushion disposed inside the mounting plate and configured to be inflated by gas supplied thereto;
a cover surrounding the cushion and having a movable lid, the movable lid configured to be cut and tilted by an inflation of the cushion;
a decoration part disposed on a front surface of the movable lid and to be rotated together with the movable lid; and
a connector having one side disposed between the cover and the decoration part and another side coupled to the mounting plate, the connector configured to restrain forward deployment of the cover when the cushion is inflated,
wherein the decoration part comprises:
a glass including a light transmitting material;
an inner panel disposed between the glass and the movable lid, the inner panel facing the glass;
a ring-shaped fixed body located in front of the glass and disposed along an outer edge of the glass; and a protruding member having a head member protruding rearward from the fixed body, penetrating the glass, the inner panel, the connector, and the movable lid, and being caught on the rear surface of the movable lid.

2. The driver-side airbag device of claim 1, wherein the connector comprises:
a first member disposed between the inner panel and the movable lid and fixed to the movable lid by the protruding member;
a second member fixed to the mounting plate; and
a connection member configured to interconnect the first member and the second member.

3. The driver-side airbag device of claim 2, wherein the cover comprises a cover housing surrounding the mounting plate and fixed to the mounting plate.

4. The driver-side airbag device of claim 3, wherein the connection member is disposed between an inside of the cover and an outside of the mounting plate.

5. The driver-side airbag device of claim 4, wherein the cover is fixed to the mounting plate in a state in which the second member is temporarily assembled to the cover, and the second member is fixed to the mounting plate after the cover has been fixed.

6. The driver-side airbag device of claim 5, wherein the second member is temporarily assembled to the cover by a side bolt and a side nut located on a side of the cover housing.

7. The driver-side airbag device of claim 5, wherein the second member is temporarily assembled to the cover by a side bolt and a side nut located on a side of the cover housing.

8. The driver-side airbag device of claim 7, wherein the protruding member has a plurality of protruding members circumferentially disposed along the fixed body.

9. The driver-side airbag device of claim 3, wherein the movable lid of the cover is configured to be rotated upwardly of the cover housing and then rotated rearwardly of the cover housing.

10. The driver-side airbag device of claim 3, wherein the movable lid is configured to be cut by a tear line formed at a boundary between the movable lid and the cover housing by the inflation of the cushion.

11. The driver-side airbag device of claim 10, wherein the tear line extends to surround an outer edge of the movable lid.

12. The driver-side airbag device of claim 1, wherein:
the protruding member penetrates an aperture formed at an edge of the glass, an aperture formed at an edge of the inner panel, an aperture formed at an edge of the first member, and an aperture formed at an edge of the movable lid; and
the head member is formed larger than a diameter of the aperture of the movable lid.

13. The driver-side airbag device of claim 1, wherein the decoration part further comprises:
an emblem disposed between the glass and the inner panel, the emblem configured to display a coat of arms; and
a light source disposed between the inner panel and the movable lid, the light source configured to radiate light toward the emblem through the inner panel.

14. The driver-side airbag device of claim 13, wherein the decoration part further comprises a diffuser disposed between the inner panel and the light source, the diffuser configured to diffuse light from the light source to the inner panel.

* * * * *